United States Patent
Alexander (10) Patent No.: US 9,258,979 B2
(45) Date of Patent: Feb. 16, 2016

(54) PET WATERING DEVICE

(71) Applicant: James Alexander, Spring Valley, NY (US)

(72) Inventor: James Alexander, Spring Valley, NY (US)

( * ) Notice: Subject to any disclaimer, the term of this patent is extended or adjusted under 35 U.S.C. 154(b) by 68 days.

(21) Appl. No.: 14/147,870

(22) Filed: Jan. 6, 2014

(65) Prior Publication Data

US 2015/0189856 A1    Jul. 9, 2015

(51) Int. Cl.
*A01K 7/00* (2006.01)
*A01K 7/02* (2006.01)
*A01K 39/02* (2006.01)

(52) U.S. Cl.
CPC .. *A01K 7/02* (2013.01); *A01K 39/02* (2013.01)

(58) Field of Classification Search
CPC ....................................................... A01K 39/02
USPC .................................................. 119/74, 61.5
See application file for complete search history.

(56) References Cited

U.S. PATENT DOCUMENTS

| | | | |
|---|---|---|---|
| 2,590,266 A * | 3/1952 | Nelson | 119/81 |
| 2,796,046 A * | 6/1957 | Berg et al. | 119/75 |
| 3,152,576 A | 10/1964 | Faurot | |
| 3,749,063 A | 7/1973 | Buffum | |
| 4,286,546 A | 9/1981 | Moore | |
| 4,371,995 A * | 2/1983 | Donhauser | 4/538 |
| 5,297,504 A | 3/1994 | Carrico | |
| 5,791,287 A | 8/1998 | Gruber | |
| 5,960,740 A | 10/1999 | Pelsor | |
| 6,032,824 A | 3/2000 | Barrow | |
| 7,430,988 B2 * | 10/2008 | Perlsweig et al. | 119/75 |
| 7,600,486 B2 | 10/2009 | Ellis | |
| 7,849,817 B1 * | 12/2010 | Warganich | 119/77 |
| 8,770,147 B2 * | 7/2014 | Rowe | 119/74 |
| 2006/0060149 A1 | 3/2006 | Skowronski | |
| 2007/0227456 A1 | 10/2007 | Borey | |
| 2007/0272163 A1 | 11/2007 | Leary | |
| 2012/0216751 A1 * | 8/2012 | Rowe | 119/72 |
| 2013/0087102 A1 | 4/2013 | Lipscomb et al. | |

FOREIGN PATENT DOCUMENTS

CA    2708704 A1    1/2012

* cited by examiner

*Primary Examiner* — Kristen C Hayes
(74) *Attorney, Agent, or Firm* — Michael E. Zall (57) ABSTRACT

A pet watering device for use in a vehicle that has a basin with sidewalls, a bottom and a porous member mounted over the bottom, forming an upper and a lower chamber. The porous member permits the passage of water from the upper to the lower chamber but preferably does not permit the reverse flow of water there through. Water is pumped from the lower to the upper chamber, the amount being substantially equal to the water passing through the porous member and sufficient to maintain the presence of a thin, constant layer of water over the porous member. The device is securely mounted in the vehicle. When the watering device is jostled by the moving vehicle water does not pass from the lower to the upper chamber through the porous member and only a small amount, if any, of water slops out over the upper rim of the basin.

14 Claims, 7 Drawing Sheets

PET WATERING DEVICE

FIELD OF THE INVENTION

This invention relates to a pet watering device and, more particularly, to a portable pet watering device that permits animals that are being transported in a moving vehicle to drink water therefrom while minimizing spillage of water from the device during the movement of the vehicle. This invention further relates to a pet watering device with flowing water that can be transported in a moving vehicle while secured therein, that is splash and spill-resistant when the vehicle makes turns or goes over bumps and potholes. The watering device provides for the continuous circulation of water through the device allowing the water to remain clean and fresh by aeration, filtering, heating and/or cooling means.

BACKGROUND OF THE INVENTION

A typical pet drinking bowl is a circular container, often of pottery or molded from a plastic material, having a wide base to give good stability to the bowl, so as to minimize the likelihood of spillage. Owners of pets, particularly dogs, like their pets to accompany them when traveling in a vehicle. Additionally, communities have come to rely upon dogs as the daily partner of police officers. The police dog spends most of its day riding in the back seat of a vehicle while awaiting the call of duty and requires a constant supply of fluids to remain healthy. Usually, the dog is provided water by the use of a bowl placed on the floor of the vehicle. However, one vehicle turn may result in the water splashing over the side of the bowl and onto the floor. Additionally, failure to refill the bowl may be detrimental to the dog's health. Continued refilling of the bowl, if the attendant officer remembers, may result in a soaked floor and unnecessary distractions. These problems are not limited to automobiles but are inherent in transportation by commercial and private aviation, boating, campers, and so forth.

If the typical pet drinking bowl containing water is placed in a car, almost inevitably the water will spill when the vehicle is in motion. Various sized bowls have been used in an attempt to minimize spillage. Even if the bowl is only half full, typical vehicle motions such as starts, stops, turns and bumps can cause the water to slosh, creating waves which exceed the height of the bowl rim. Spills can soak into the vehicle carpet resulting in the growth of molds, mildew, odors, and rust of the vehicle body. Previous efforts to reduce spills in vehicles have focused primarily on beverage containers for human use and little effort has been dedicated to pet water containers.

One solution to this problem is to provide water to the pet only when the vehicle is stopped, and remove the water when the travel resumes. While this method certainly avoids sloshes and spills, the pet may not receive adequate water. Pets are often excited at the start and end of a trip and may be too preoccupied with the people and events to drink adequate water. A dehydrated pet may also drink too much water too fast resulting in the animal becoming sick. In addition, on long trips, infrequent water stops may result in poor time coordination with the pet's need for water and need to urinate.

Additionally, many animals have a preference for drinking flowing water. Flowing water may provide a number of advantages, including improved taste and quality, more dissolved oxygen, which can make the water taste better as well as provide potential health benefits. Further, such flowing water encourages the pet to drink more liquids. Increased water intake can help reduce problems with the pet's kidneys or urinary tract.

Additionally, pets will often demonstrate a preference for cold, e.g., recently poured, water and clinical tests have shown that cooler water helps lower the pets overall body temperature. So there is clearly a need for a refrigerated pet-feeding dish to thermally control food and water temperature at all times.

Pet fountains are well known in the art and generally include a spout or other water-directing means for providing a continuous flow of water from a reservoir to a container such that the pet is able to drink either directly from the flowing water stream or from the container. Such fountains may contain a plurality of containers or basins, can occupy a large amount of floor space and are open to permit easy access by the pet. Typically, they are stationary and placed on the floor in the residence or kennel. These fountains are designed to be stationary in the pet owner's residence. Typically, if they are moved, sometimes even to a minor extent, water flows out of the fountain to the surrounding area onto the floor. Such pet fountains typically use electronic pumps to pump the water through the device and may have a means for filtering the water.

To Applicant's knowledge there have been no pet fountains that are designed for use in a moving vehicle, such as an automobile or recreation vehicle.

The following are references that may (but not necessarily) be relevant to the claimed invention herein:

US Publication No. 2013/0087102 to Lipscomb describes a pet fountain that has circulating water that is continuously filtered and pumped through the fountain. The fountain includes a basin and a cover. A pump assembly is housed between the basin and cover, and circulates water through the pet fountain by pumping the water from the basin to an upper drinking bowl of the cover. The water spills out of the upper drinking back to the basin. An opening is provided between the cover and the basin which allows a pet to drink directly from the basin in addition to the upper drinking bowl of the cover.

US Publication No. 2012/0216751 to Rowe describes a watering device for pets that includes a bowl that includes a dispensing unit and means to filter the water flowing through the bowl.

US Publication No. 2007/0272163 to Leary describes a pet feeding bowl with an attached splashguard that acts as a retention barrier to protect walls, floors and other adjacent surfaces from over spray, splashes, and splatters that occur when a pet feeds from the bowl.

US Publication No. 20070227456 to Borey describes a refrigerated pet feeding assembly with a removable thermally conductive dish designed to contain food, water or both that is continuously cooled by a thermoelectric Peltier-effect conditioning source and powered by an external DC voltage source such as a wall mount power supply or battery.

US Publication No. 2006/0060149 to Skowronski describes a spill-resistant fluid container that includes a chamber for holding a quantity of fluid. Within the chamber is a plurality of cavities. The cavities are circumferentially arranged so as to define a central chamber area. Each of the cavities has at least one opening so that the plurality of cavities is in restricted fluid communication with the central chamber area.

U.S. Pat. No. 7,600,486 to Ellis describes a drinking bowl for a pet adapted for use in a moving vehicle that has a base section which defines a liquid reservoir having a cylindrical side wall and a removable in-turned rim at the upper end thereof. An inner section has sufficient buoyancy to float on liquid in the reservoir, the inner section being a close sliding fit within the side wall and having a dished upper surface with a central liquid-receiving area. A plurality of liquid feed holes extends through the inner section to permit liquid to flow into the central area from which a pet may drink.

U.S. Pat. No. 6,032,824 to Barrow describes a spill-less wave bowl for use by pets and small children. The wave bowl is designed to prevent contents such as liquids in the bowl from spilling out over the edge of the bowl and from the bowl overturning. The spill-less wave bowl includes an inner bowl snapped to the inside of an outer shell. The inner bowl includes a bowl base in a lower portion of the bowl, sloping sides extending upwardly and outwardly from the bowl base and a circular bowl flange with snap arm disposed around an edge of an upper portion bowl. When the wave bowl is hit or bumped, any liquid therein rides up against the inside of the inner bowl and into the interior concave-shaped cavity in the upper portion of the shell forming a wave which returns to the interior of the inner bowl.

U.S. Pat. No. 5,960,740 to Pelsor describes a splash and spill-resistant container for holding a fluid for consumption by an animal. The container forms a cavity with a top access aperture which defines an inverted channel. A partition divides the cavity into first and second chambers. The partition curves downward from the periphery substantially to the floor of the container and is provided with a flow aperture, thereby allowing fluid communication between the first and second chambers. A valve is also provided to release air from the second chamber. After filling the container with a volume of fluid, the container may be subjected to lateral jarring or inverted without spilling the fluid contained therein.

U.S. Pat. No. 5,791,287 to Gruber describes a vessel (bowl) for transportation of water for animals that has resistance to splashing while offering easy access to the liquid. Most of the water within the vessel is below a substantially concave floating dish, while a smaller portion of water is within the dish; the animal accesses only the smaller portion. Water flows from below the dish to above through an opening in the dish. The floating dish prevents the splash of water by floating against an arched lid, blocking the flow of water, and by directing the flow of water under the lid, made possible by protrusions in the lid.

U.S. Pat. No. 5,297,504 to Carrico describes a spill-resistant container having an automatic refill feature and a low profile design that allows the animal ease of access to drinking water and resists tipping of the container. Water within the container is prevented from spilling by use of an annular housing that maintains water spillage from an upwardly facing substantially concave internal dish within the housing. The dish defines at least one aperture therein to allow spilled water to re-enter the dish for consumption by the animal. Apparatus may be provided for automatically or manually actuating a flow of water from an external reservoir to refill the dish to a predetermined level.

U.S. Pat. No. 4,286,546 to Moore describes an anti-splash animal watering container including a water holding dish or bowl having straight sides in combination with an apertured disc which floats upon the liquid carried therein. The floating disc floats in the liquid with a substantial portion extending above the liquid level. At its center, an aperture is located through which an animal has access to the liquid in the bowl. This aperture may be changed to enable the use of the watering device for different sized animals and still retain its anti-splash characteristics.

U.S. Pat. No. 3,749,063 to Buffum describes a pet feeding dish that resists tipping and spilling. The dish is weighted and is a pivotally supported bowl or container with a turned-in lip for reducing spillage during use.

U.S. Pat. No. 3,152,576 to Faurot describes an anti-splash watering bowl for animals.

Canadian Patent 2,708,704 to Danie describes a travel mug for small animals, e.g., cats, dogs, to drink fluids while travelling in vehicle. The mug is designed to fit in a cup holder in the vehicle and to eliminate spill and waste of the fluids inside the travel mug during the travel or the drinking process. The mug consists of two parts—a bottom part with anti-splash features that fits into a standard cup holder or beverage holder and an off center top part wider than the bottom part also with anti-splash features. The fluid only resides in the bottom part of the mug and the animal's head enters the top part of the mug and the animal's tongue extends into the bottom part to lick up the fluid.

The pet watering device of this invention provides substantially continuously-moving, drinking water, optionally filtered, heated and/or cooled, that can be used in a moving vehicle without fear of water falling out of the device into the vehicle.

OBJECTS AND SUMMARY OF THE INVENTION

It is an object of the present invention to provide a pet watering device that will resist tipping and spilling while being transported in a vehicle.

It is a further object of this invention to provide a pet watering device that can be used in a moving vehicle and that provides continuously flowing water.

It is yet another object of this invention to provide a pet watering device that is suitable for use in a moving vehicle and provides a continuous flow of drinking water for an animal being carried in the vehicle, and that has a reduced likelihood of spillage of water despite motion of the vehicle when transporting the animal.

It is still another object of this invention to provide a pet watering device that can be used in a moving vehicle that minimizes dripping, splashing or sloshing of the water from the watering device while the vehicle is moving and can provide continuously flowing water that can be continuously cooled, heated and/or filtered.

It is another object of the present invention is to provide a pet watering device that may be used in a moving vehicle, has a continuous flow of water that may be heated, cooled and/or filtered, is resistant to spilling due to the motion of the vehicle and is of durable, construction and is easily and inexpensively manufactured.

Additional objects, advantages and other novel features of the invention will be set forth in the description that follows and will become apparent to those skilled in the art.

Broadly, a pet watering device is provided for use in a vehicle that has a basin with peripheral sidewalls, a bottom and a porous member mounted over the bottom, forming an upper and a lower chamber. The porous member permits the passage of water from the upper to the lower chamber but preferably does not permit the reverse flow of water there through. Water is pumped from the lower to the upper chamber, the amount being substantially equal to the water passing through the porous member and sufficient to maintain the presence of a thin, relatively constant layer of water over the porous member. The device is securely mounted in the vehicle. When the watering device is jostled by the moving vehicle preferably water does not pass from the lower to the upper chamber through the porous member and only a small amount, if any, of water slops out over the upper rim of the basin which rises a sufficient height above the layer to minimize spill over.

More specifically, the pet watering device includes a first basin for holding water that has peripheral sidewalls extending upward from a bottom wall, the peripheral sidewalls having an interior surface, exterior surface and upper rim. A porous member or plate, having a plurality of holes there through is mounted to the interior of the peripheral walls over the bottom wall to form an upper chamber and lower chamber in the first basin. The plurality of holes in the porous member permit the passage of a first amount of water over a period of time from the upper chamber to the lower chamber but preferably do not permit the flow of a substantial amount of water over a period of time from the lower chamber to the upper chamber. The upper chamber of the first basin is open to permit the pet to drink water therefrom over the upper rim.

An electrical pump is provided for pumping a second amount of water over a period of time from the lower chamber to the upper chamber. The second amount of water over a period of time that is pumped from the upper chamber to the lower chamber is generally or about no greater than the first amount of water over a period of time passing through the porous member from the upper chamber to the lower chamber. The flow of the second amount of water is sufficient to maintain the presence of a generally constant layer, preferably a thin layer, of water over the porous member and below the upper rim, which rises above the layer a sufficient amount to prevent spill over. A mounting means is provided for securely mounting the pet watering device in a vehicle such that the porous member is on a level plane.

Thus, when the watering device is tilted from the level plane a minimal amount of water passes from the lower chamber to the upper chamber through the porous member and water does not slop out over the upper rim.

These and other objects of the present invention will become apparent to those skilled in the art when reviewing the following detailed description, showing novel construction, combination, and elements as herein described, and more particularly defined by the claims.

BRIEF DESCRIPTION OF THE DRAWINGS

Further aspects, features and advantages of the present invention will become even more apparent with reference to the following detailed description and the accompanying drawings.

The drawings are not presented to scale but are only used to illustrate the principles of the invention. In the various views of the drawings, like reference characters designate like or similar parts throughout the several views.

DETAILED DESCRIPTION OF THE INVENTION

Figure 1:
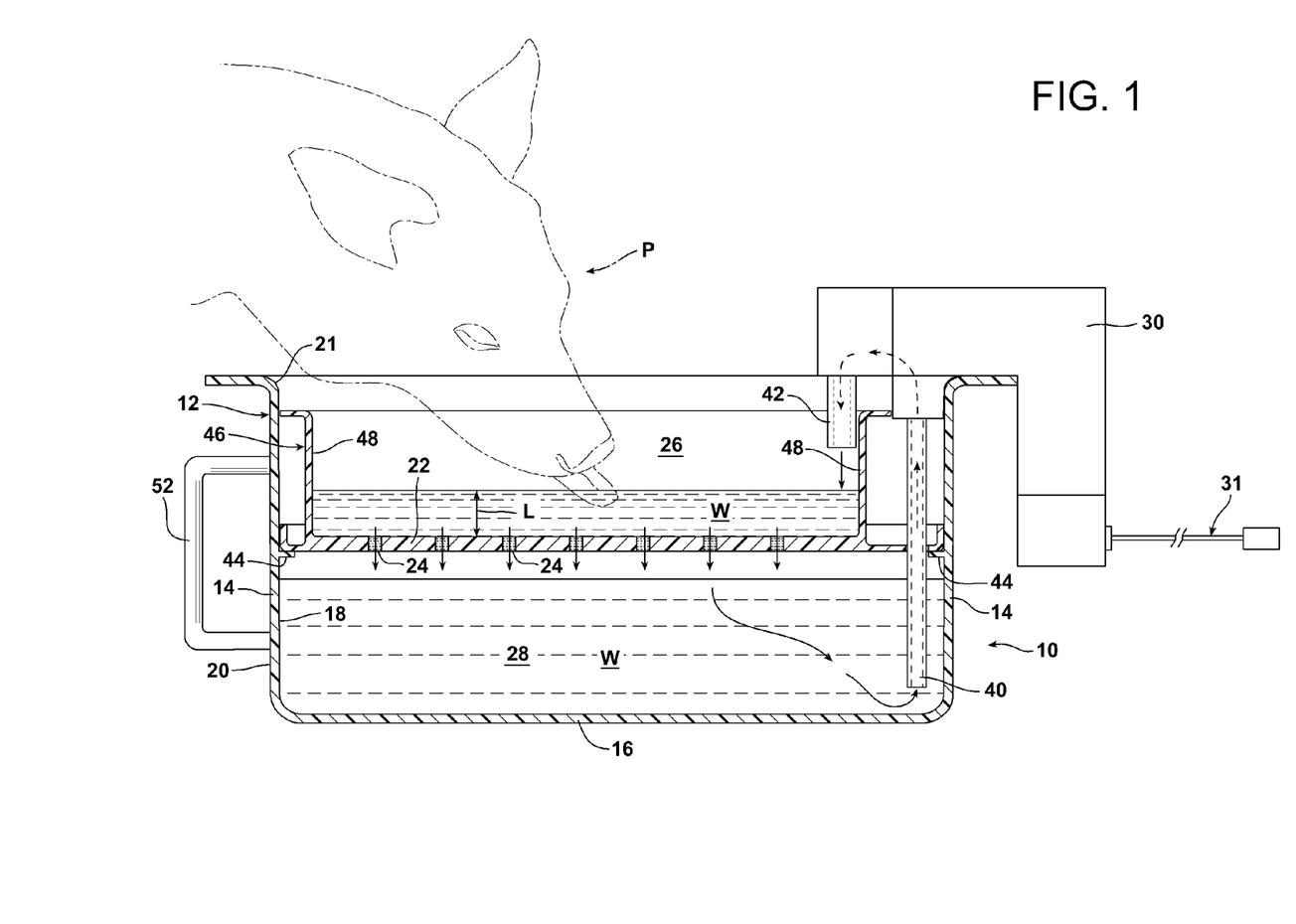
FIG. 1 is a cross-sectional view of an embodiment the pet watering device of this invention.
Figure 2:
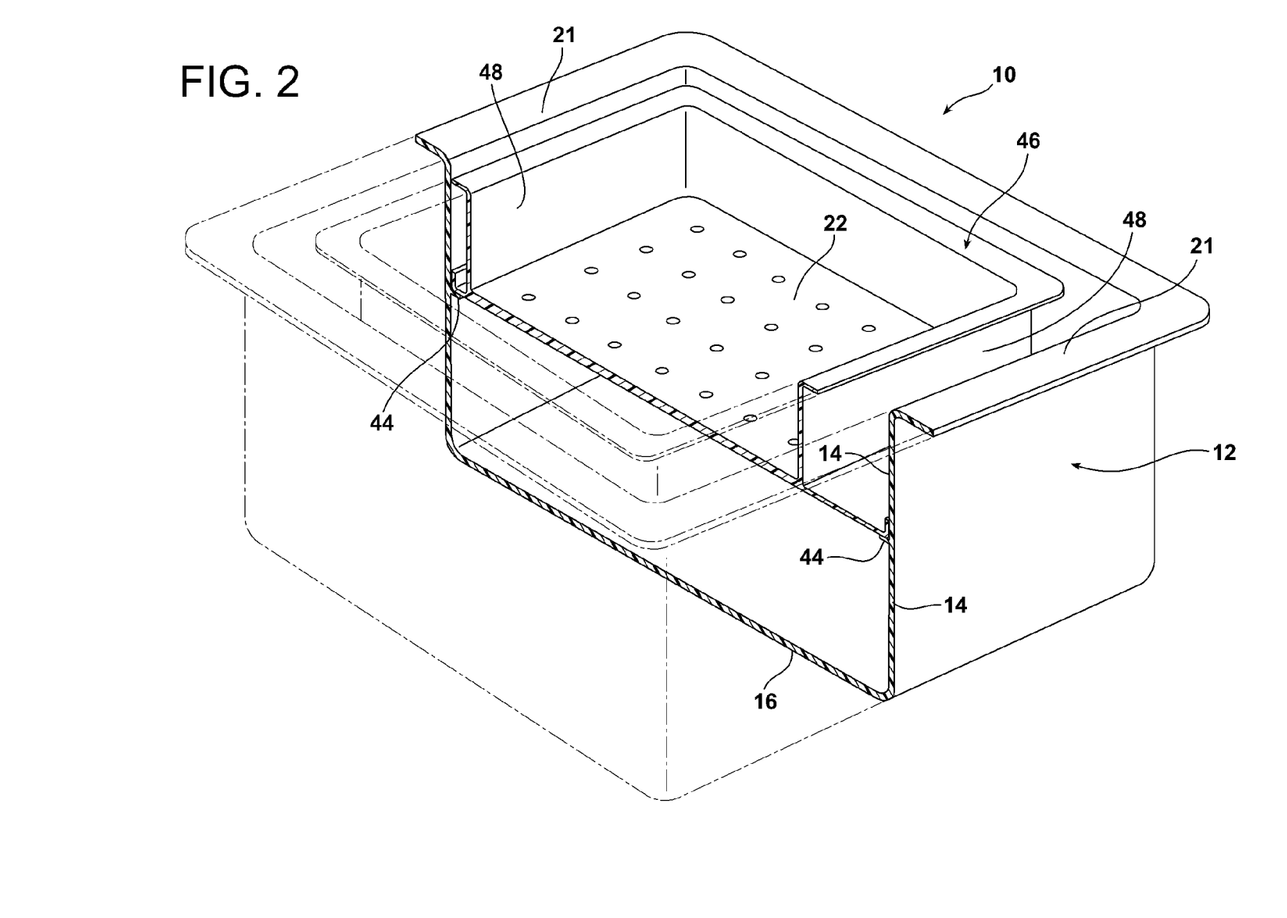
FIG. 2 is a front, top cross-sectional perspective view of a portion of the pet watering device of FIG. 1.
Figure 3:
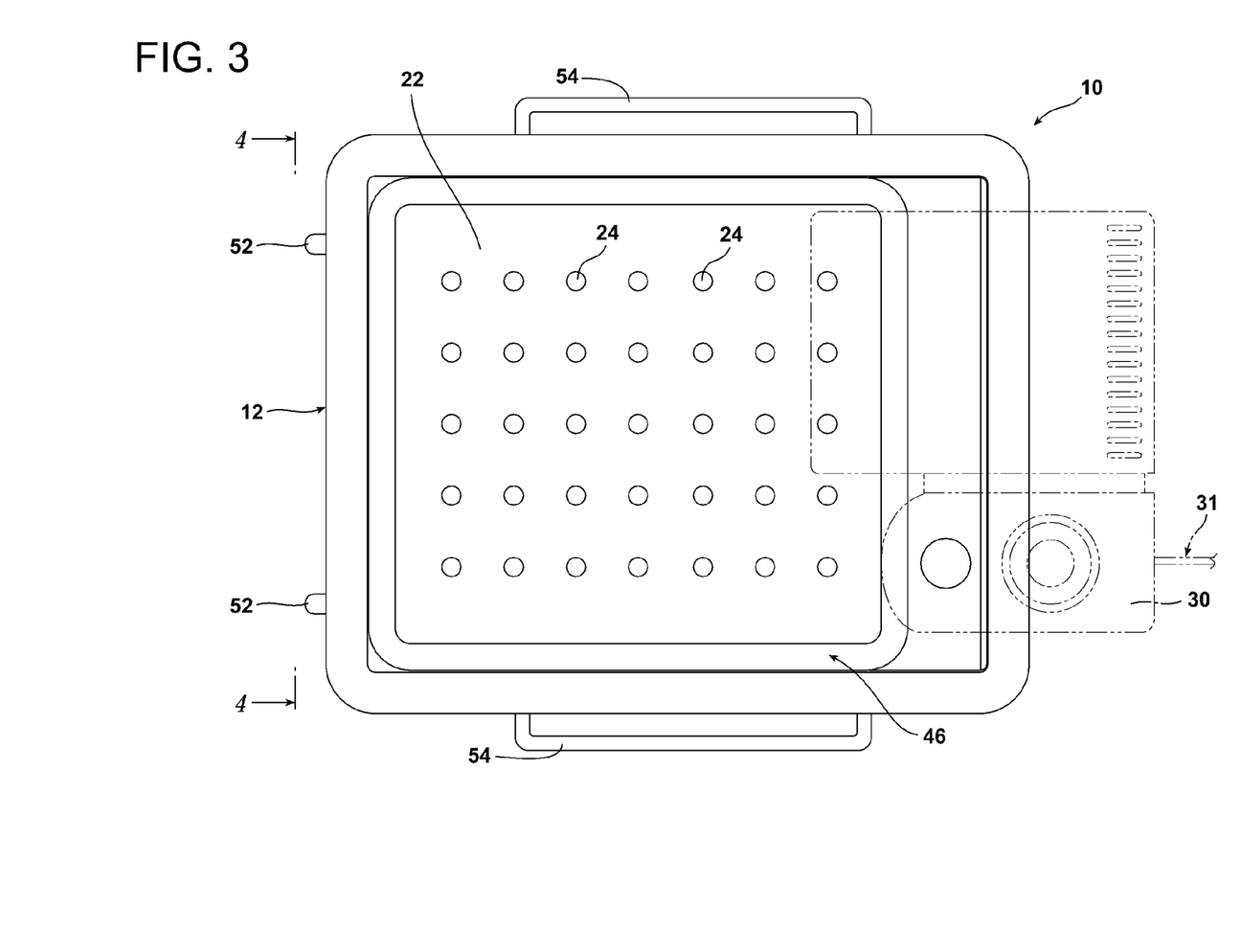
FIG. 3 is a top view of the pet watering device of FIG. 1.
Figure 4:
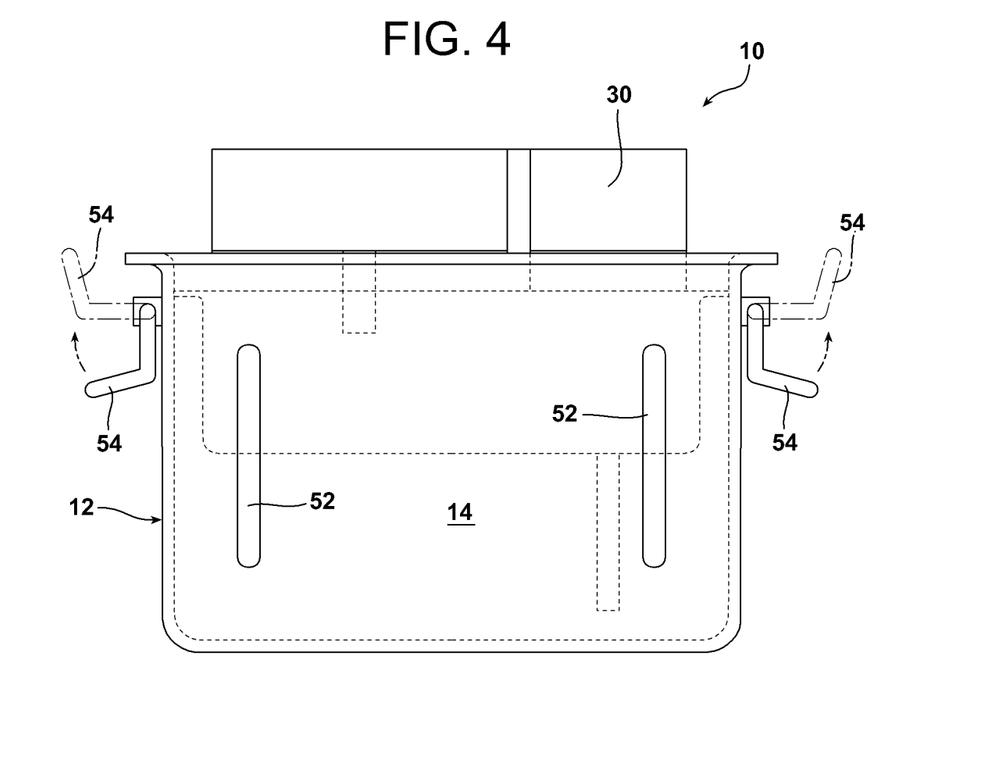
FIG. 4 is a side view of the pet watering device of FIG. 1 taken along line 4-4 of FIG. 3.
Figure 5:
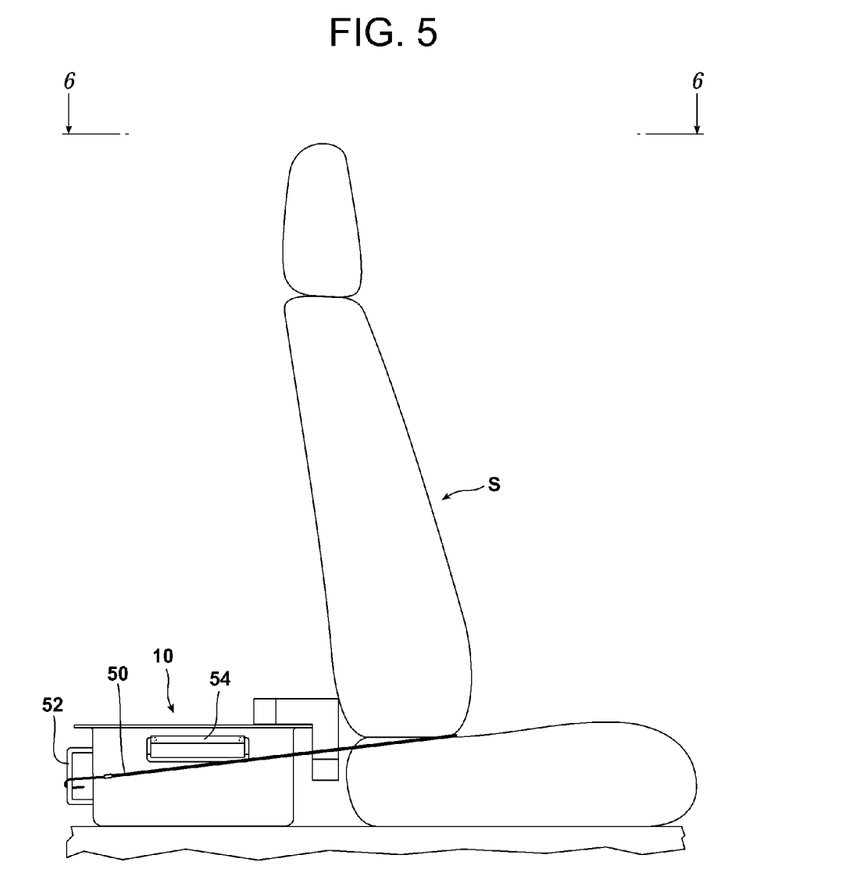
FIG. 5 is schematic side view of the pet watering device of FIG. 1 secured in the rear of a vehicle.
Figure 6:
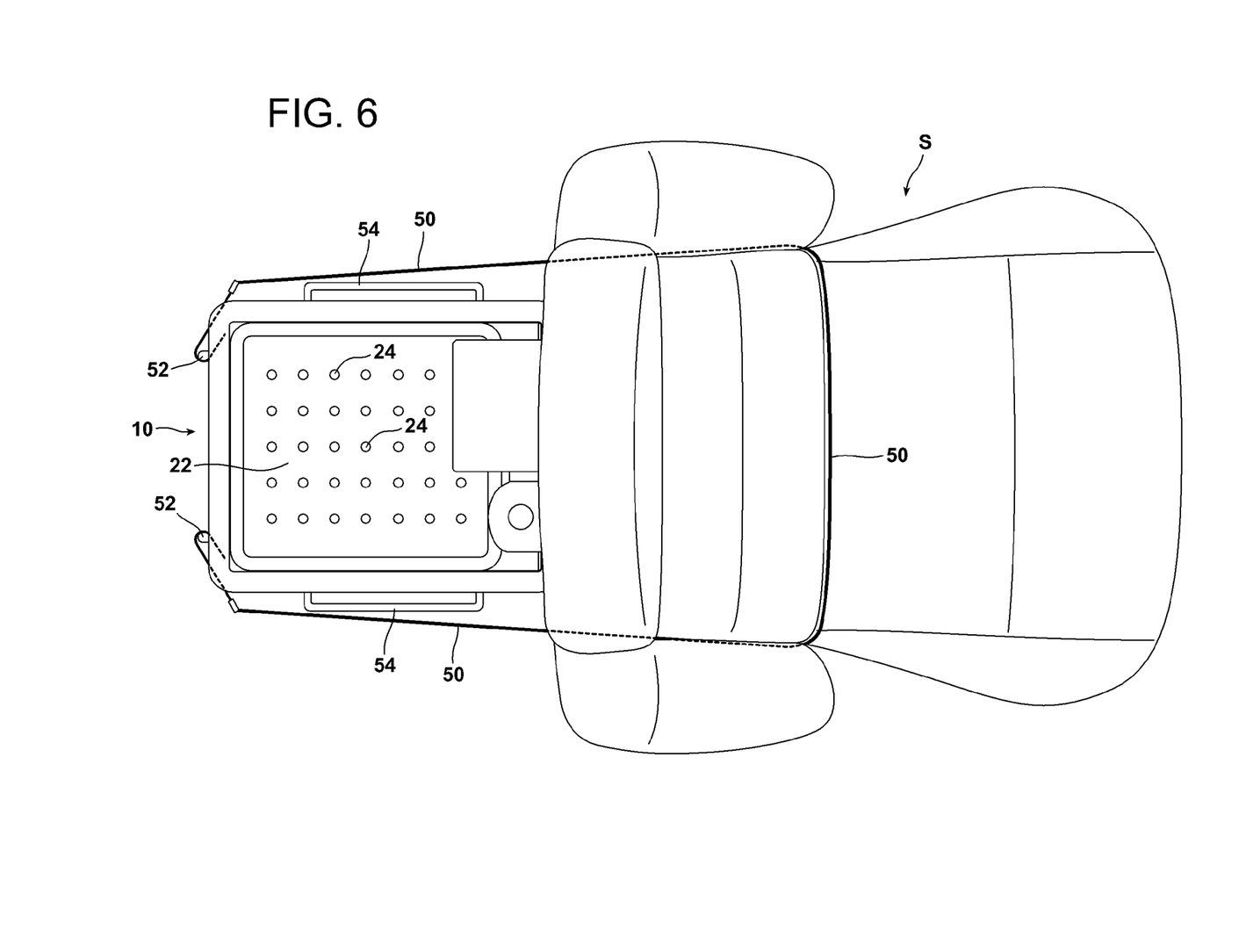
FIG. 6 is a schematic top view of the pet watering device of FIG. 1 taken along line 6-6 of FIG. 5 secured in the rear of a vehicle.

FIGS. 1-8 depict an example of the pet watering device 10 of this invention showing a pet P (FIG. 1) drinking water therefrom. Referring to FIGS. 1-3, for example, the pet watering device 10 includes a first basin 12 designed to hold water W. Although not critical, the pet watering device 10, including the first basin 12 and all other parts, may be molded out of a conventional plastic such as, and not limited to, Lexan, Acrylic, ABS or more commonly polypropylene. The pet watering device 10 may also have parts made of stainless steel for ease of cleaning and disinfection. The first basin 12 has first basin peripheral sidewalls 14 extending upward from a first basin bottom wall 16. Referring to FIGS. 1 and 2, the first basin peripheral sidewalls 14 have an interior surface 18 and an exterior surface 20. An upper rim 21 defines the top of the first basin 12.

Still referring to FIGS. 1-3, a porous member 22 is provided that has a plurality of holes 24 there through. The porous member 22 is mounted to the interior surface 18 of the first basin peripheral sidewalls 14 essentially parallel to the bottom wall 16 to form an upper chamber 26 and lower chamber 28 in the first basin 12.

The holes 24 in the porous member 22 are designed to permit the passage of a first amount of water over a period of time (e.g., gallons/hour; cc/min, etc., hereinafter sometimes "an amount of water") from the upper chamber 26 to the lower chamber 28. However, preferably the hole 24 is also designed to not permit the flow of a substantial amount of water W in the opposite direction, i.e., from the lower chamber 28 to the upper chamber 26.

This may be accomplished by several means. For example, the holes 24 may be tapered, having a larger opening facing the upper chamber 26 than the lower chamber 28. Thus, the continuous static head of water W produced in the upper chamber 26 combined with the larger opening drives the water through the hole 24. The smaller opening of the hole 24 facing the lower chamber 28 tends to prevent water W from entering the hole 24 due to water tension around the hole 24 and the lack of a head of water W.

Other means of producing such an effect can be accomplished by using various type membranes having such a hole structure. For example, certain polymeric filter membranes, paper filters and cellulosic filters can produce such a porous member 22.

Figure 7:
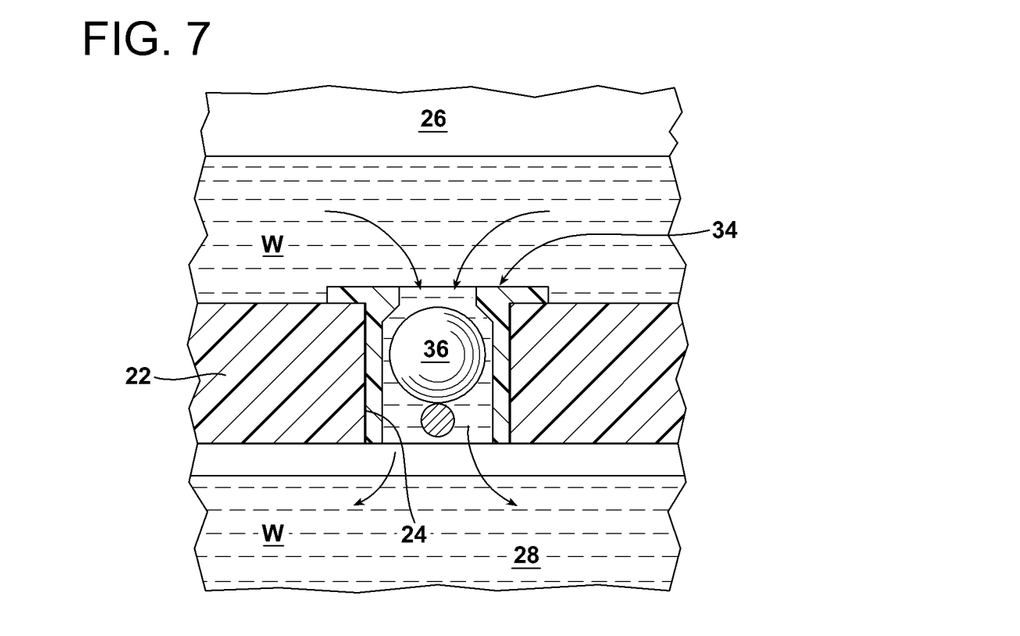
FIG. 7 is a cross-sectional view of a flow valve that could be used in the "open" position to permit in normal flow of water from the upper chamber to the lower chamber of the pet watering device of this invention
Figure 8:
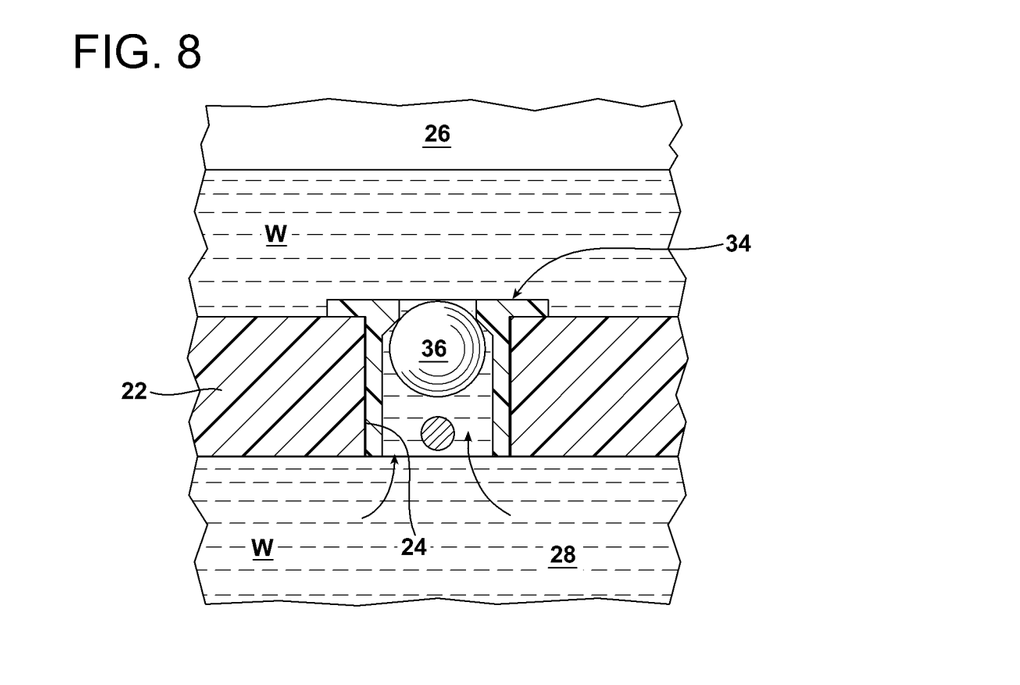
FIG. 8 is a cross-sectional view of the flow valve shown in FIG. 7 in the "closed" position to prevent the flow of water from the lower chamber to the upper chamber when there is for example, a bump, in the road or the pet watering device gets turned on its side or upside down.

FIGS. 7 and 8 depict the holes 24 with a one way valve, e.g., a ball valve 34. Each of the holes 24 may have such ball valve 34. Referring to FIG. 7, the ball valve 34 has a ball 36 therein that when the water head W in the upper chamber 26 causes flow in the direction of the arrows depicted in FIG. 7, from the upper chamber 26 to the lower chamber 28, the ball 36 is pushed downward to permit the flow of water W. On the other hand, referring to FIG. 8, when a water head from the lower chamber 28 wants to cause the water W to flow from the lower chamber 28 to the upper chamber (e.g., water sloshes up due to the movement of the vehicle, the water device 10 overturns), the ball 36 is lifted and blocks the flow of water W to the upper chamber 26.

It is evident that the curvatures and slopes of the surfaces that make contact with the water W, particularly the porous member 22, can be configured in shape and size to facilitate ease of water flow in and around the upper chamber 26. For example, the porous member 22 can be sloped to encourage positive flow of water W around the upper chamber 28 or sloped so as to create a funnel-like shape to encourage the directional flow of water W in the upper chamber 26 to accomplish greater circulation and aeration of the water W or to enhance or decrease flow from the upper chamber 26 to the lower chamber 28. Likewise, the upper rim 21 can be curved inward (not shown) to minimize sloshing over the upper rim 21.

Referring to FIGS. 1-3, preferably for ease of cleaning and/or construction, the porous member 22 is removable. This can be accomplished by having the porous member 22 resting on or removably mounted on a ledge 44 protruding from the interior surface 18 of the peripheral sidewalls 14 of the first basin 12. Optionally, as depicted FIGS. 1-4, the porous member 22 is a bottom surface 22 of a second basin 46 that is resting on the ledge 44 protruding from the interior surface 18 of the peripheral sidewalls 14 of first basin 12. Referring to FIGS. 1-3, the second basin 46 has second basin peripheral sidewalls 48 that removably interlock with portions of the interior surface 18 of the peripheral sidewalls 14 of the first basin 12 to maintain the second basin 46 in place.

Referring to FIGS. 1 and 3, an electrical pump 30 is used to pump an amount of water W from the lower chamber 28 to the upper chamber 26. The electrical pump 30 may be powered by at least one battery (not shown) or, as shown in FIG. 1, powered by the vehicle electrical system through an adapter 31 that plugs into such electrical system.

FIGS. 1-6, and in particular to FIGS. 1 and 3, illustrate the circulating operation of the pet watering device 10 of this invention, wherein direction arrows mimic the directional water flow achieved by the pet watering device 10 during operation. The water W is drawn from the lower chamber 28 through inlet tube 40 through electrical pump 30 and then through outlet tube 42 into the upper chamber 26 (see directional arrows in FIG. 1). Water W in the upper chamber 26 then flows through the plurality of holes 24 in the porous member 22 to the lower chamber 28 and the electrical pump 30 repeats the cycle of circulation. As the water W passes through the electrical pump 30 and the inlet and outlet tubes 40,42, apparatus may be added to the electrical pump 30 and/or tubes 40, 42 to heat, cool and/or filter the water W, i.e. heating means, cooling means and/or water filtering means.

The electrical pump 30 pumps a second amount of water, i.e., over a period of time, from the lower chamber 28 to the upper chamber 26 that is no greater than the first amount of water passing through the porous member 22 from the upper chamber 26 to the lower chamber 28. Such a flow is sufficient to maintain the presence of generally constant, preferably thin, layer of water L (FIG. 1) over the porous member 22. The layer L of water should not appreciably thicken over a period of time so that it runs or sloshes over the upper rim 21. Taking into consideration the equipment utilized and the drinking capacity of the pet P, the layer L of water W should be is as thin as possible so that there is less water W in the basin and less of a chance that the water W will slop over the upper rim 21. It is thus highly desirable that the electrical pump 30 be capable of variable flow so that the thickness of the water layer L can be accurately controlled. Although the optimum thickness of this layer is highly dependent on the size of the pet watering device 10, porosity of the porous member 22, the amount of water the pet P drinks and other factors, it has been practical to maintain the water level thickness L at between 0.25 inches and 2 inches.

The pet watering device is further provided with a mounting means for securely mounting the pet watering device in a vehicle such that the porous member 22 is on a level plane. Many such devices could be utilized depending on the type vehicle, size of the pet watering device, etc. For example, the pet watering device 10 could be mounted by clips on the back of the front car seat and hang in the back therefrom, it could be mounted in the rear of an SUV by latches attached to the bottom, etc. The mounting means depicted in FIGS. 5 and 6 herein includes a bungee cord 50 that wraps around the front car seat S at the intersection of the back of the vehicle seat S and the horizontal portion of the seat S therefore, the ends of which are hooked on two handles or hooks 52 that are mounted to the exterior surface 20 of the first basin 12 peripheral sidewall 14 of the pet watering device 10 (see FIGS. 1, 3-6).

The pet watering device 10 further has, for ease of carrying (particularly when filled with water W, a carrying handle 54 mounted to the exterior surface 20 of each side the first basin 12 peripheral sidewall 14 of the pet watering device 10 (see FIGS. 3-6). As indicated, the handles 54 can be handles 54 that swivel up for use and down for presenting a smoother or unobstructed sidewall 14, see FIG. 4.

Referring to FIGS. 1 and 3 an electrical water pump 30 can be configured to fit on the pet watering device 10. Other shapes and types of electrical water pump 30 besides the illustrated water pump 30 could also be used without departing from the broader scope and spirit of the present invention.

Water is added to the lower chamber 28, although it can also be added to the upper chamber 26 and permitted to flow through the porous member 22 such that water becomes pooled inside the lower chamber 28 of the basin 12. In operation, the electrical water pump 30 can be powered to pump the water from the lower chamber 28 to the upper chamber 26 via the inlet tube 40 to the outlet port 42, as indicated by the direction arrows of FIG. 1. Once the water is pumped into the upper chamber 26, the water circulates around the upper chamber 26 and then re-enters the lower chamber 28 through plurality of holes in the porous member 22 as shown by the arrows in FIG. 1. A filter member can take the form of a narrow diaphragm-like member installable into the inlet tube 40 or outlet tube 42. The filter member thus creates a permeable wall to filter the water as the water re-enters the upper chamber 26 after the water has been circulated completely around the pet watering device 10.

It is noted that the simplified diagrams and drawings herein may not illustrate all the various connections and assemblies of the various components, however, those skilled in the art will understand how to implement such connections and assemblies, based on the illustrated components, figures, and descriptions provided herein.

In view of the present disclosure, it is evident that embodiments of the present invention can provide pet watering devices having a number of advantages. For instance, various embodiments can be contemplated that make the device easy to clean and maintain, such as by having parts which are easily removed or replaced. Indeed, certain embodiments include an easily removable filter, which may be a pre-filter that helps trap debris before water passes to the upper chamber 26. It is possible to construct the detachable portions to include convenient slide-in or snap-on parts that can be easily removed, but which are secured against the base unit to prevent accidental removal or removal by a pet.

The invention has been described with reference to various specific and illustrative aspects and techniques of the present invention. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the appended claims.

What is claimed is:

1. A pet watering device comprising:
   a. a first basin for holding water that has first basin peripheral sidewalls extending upward from a first basin bottom wall, the first basin peripheral sidewalls having an interior surface, exterior surface and upper rim;
   b. a porous member having a plurality of holes there through, the porous member mounted to the interior of the first basin peripheral sidewalls over the bottom wall to form an upper chamber and lower chamber in the first basin,
      i. wherein the plurality of holes in the porous member permit the passage of a first amount of water over a period of time from the upper chamber to the lower, and
      ii. wherein the upper chamber is open to permit the pet to drink water therefrom;
   c. an electrical pump means for pumping a second amount of water over a period of time from the lower chamber to the upper chamber,
      i. wherein the second amount of water over a period of time that is pumped from the lower chamber to the upper chamber is about no greater than the first amount of water over a period of time passing through the porous member from the upper chamber to the lower chamber, sufficient to maintain the presence of about a constant layer of water over the porous member and below the upper rim; and
   d. a mounting means for securely mounting the pet watering device in a vehicle such that the porous member is on a level plane.

2. The pet watering device of claim 1, wherein the porous member is removably mounted to the first basin peripheral walls.

3. The pet watering device of claim 1, wherein the porous member is removably mounted to the first basin peripheral walls by resting on a ledge protruding from the interior surface of the first basin peripheral sidewalls of the first basin.

4. The pet watering device of claim 3, wherein the first basin peripheral sidewalls removably interlock with the first basin peripheral walls.

5. The pet watering device of claim 1, wherein the porous member is a bottom surface of a second basin having second basin peripheral sidewalls, the second basin resting on a ledge protruding from the interior surface of the first basin peripheral sidewalls.

6. The pet watering device of claim 1, wherein the constant layer of water over the porous member is from 2 inches to 0.25 inches.

7. The pet watering device of claim 1, wherein the electrical pump is powered by at least one battery.

8. The pet watering device of claim 1, wherein the electrical pump is powered by an electrical system in the vehicle.

9. The pet watering device of claim 1, wherein the pet watering device further includes a heating means for heating the water.

10. The pet watering device of claim 1, wherein the pet watering device further includes a cooling means for cooling the water.

11. The pet watering device of claim 1, wherein the pet watering device further includes a filter for filtering the water.

12. A pet watering device comprising:
    a. a first basin for holding water that has first basin peripheral sidewalls extending upward from a first basin bottom wall, the first basin peripheral sidewalls having an interior surface, exterior surface and upper rim;
    b. a porous member having a plurality of holes there through, the porous member mounted to the interior of the first basin peripheral sidewalls over the bottom wall to form an upper chamber and lower chamber in the first basin,
       i. wherein the plurality of holes in the porous member permit the passage of a first amount of water over a period of time from the upper chamber to the lower chamber but do not permit the flow of water over a period of time from the lower chamber to the upper chamber; and
       ii. wherein the upper chamber is open to permit the pet to drink water therefrom;
    c. an electrical pump means for pumping a second amount of water over a period of time from the lower chamber to the upper chamber,
       i. wherein the second amount of water over a period of time that is pumped from the lower chamber to the upper chamber is about no greater than the first amount of water over a period of time passing through the porous member from the upper chamber to the lower chamber, sufficient to maintain the presence of about a constant layer of water over the porous member and below the upper rim; and
    d. a mounting means for securely mounting the pet watering device in a vehicle such that the porous member is on, a level plane.

13. The pet watering device of claim 12, wherein each of the plurality of holes has a one way valve that permits the flow of water from the upper chamber to the lower chamber but does not permit the flow of water from the lower chamber to the upper chamber.

14. The pet watering device of claim 13, wherein the one way valve is a ball valve.

\* \* \* \* \*